(12) United States Patent
Fernando

(10) Patent No.: US 10,342,172 B2
(45) Date of Patent: Jul. 9, 2019

(54) FOLDING STAND FOR AN AGRICULTURAL IMPLEMENT

(71) Applicant: CNH Industrial America LLC, New Holland, PA (US)

(72) Inventor: Buweneke Fernando, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 190 days.

(21) Appl. No.: 15/395,191

(22) Filed: Dec. 30, 2016

(65) Prior Publication Data
US 2018/0184574 A1 Jul. 5, 2018

(51) Int. Cl.
| | | |
|---|---|---|
| A47B 3/00 | (2006.01) | |
| A01B 76/00 | (2006.01) | |
| F16M 11/38 | (2006.01) | |
| A01B 59/06 | (2006.01) | |

(52) U.S. Cl.
CPC ............ *A01B 76/00* (2013.01); *F16M 11/38* (2013.01); *A01B 59/06* (2013.01); *A47B 3/002* (2013.01)

(58) Field of Classification Search
USPC ............ 248/688, 676, 677, 370, 188, 188.1, 248/188.6, 188.8, 188.91, 351, 354.6; 254/418, 420, 429, 421, 422, 423, 424
See application file for complete search history.

(56) References Cited

U.S. PATENT DOCUMENTS

| | | | | |
|---|---|---|---|---|
| 1,895,170 A | * | 1/1933 | Nabors ............. | B62D 53/0857 280/763.1 |
| 2,162,181 A | * | 6/1939 | Skinner ............. | B60S 9/04 248/354.1 |
| 2,383,666 A | * | 8/1945 | Martin ............. | B60S 9/10 254/420 |

(Continued)

FOREIGN PATENT DOCUMENTS

JP 2010207101 9/2010

*Primary Examiner* — Terrell L McKinnon
*Assistant Examiner* — Michael McDuffie
(74) *Attorney, Agent, or Firm* — Rebecca L. Henkel; Rickard K. DeMille

(57) ABSTRACT

In one embodiment, an agricultural implement system includes a folding stand. The folding stand includes an attachment member configured to attach the folding stand to an agricultural implement, wherein the attachment member comprises a track. The folding stand further includes a support member coupled to attachment member, wherein the support member comprises a sliding member disposed onto the track, the sliding member configured to slidably follow the track. The folding stand additionally includes an abutment member disposed on a first end of the support member and configured to abut against a portion of the agricultural implement when the folding stand is in a fully deployed position and to not abut against the portion of the agricultural implement when the folding stand in a stowaway position. The folding stand also includes a base plate disposed on a second end of the support member opposite the first end and configured to abut against a ground or a bed of a transport vehicle when the folding stand is in the fully deployed position, wherein the folding stand is configured to aid in carrying a weight of the agricultural implement when in the fully deployed position.

13 Claims, 6 Drawing Sheets

(56) References Cited

U.S. PATENT DOCUMENTS

| | | | | |
|---|---|---|---|---|
| 2,631,862 A * | 3/1953 | Johnson | ............... | B60S 9/02 213/179 |
| 2,749,995 A | 6/1956 | Klemm et al. | | |
| 2,851,250 A * | 9/1958 | Hansen | ............... | B60S 9/02 188/5 |
| 3,075,790 A | 1/1963 | Hansen et al. | | |
| 3,181,891 A | 5/1965 | Moats | | |
| 3,190,480 A * | 6/1965 | Ambrose | ............ | B60P 1/6427 248/351 |
| 3,281,160 A * | 10/1966 | Vinther | ............... | B60S 9/02 248/351 |
| 3,396,928 A * | 8/1968 | Lay | ............... | A47B 3/0815 108/129 |
| 3,474,997 A * | 10/1969 | Hinrichsen | ............ | F16B 7/105 248/354.6 |
| 3,933,372 A * | 1/1976 | Herndon | ............... | B60P 3/36 280/763.1 |
| 4,162,796 A | 7/1979 | Mead | | |
| 5,087,013 A * | 2/1992 | Gress | ............... | B23Q 9/00 248/129 |
| 5,141,197 A * | 8/1992 | Mackaay | ............... | B60P 3/32 248/188.5 |
| 5,297,771 A * | 3/1994 | Gilbert | ............... | G10D 3/003 248/443 |
| 5,348,258 A * | 9/1994 | Rasmussen | ............ | B60S 9/04 248/218.4 |
| 5,497,715 A | 3/1996 | Meek et al. | | |
| 6,176,470 B1 * | 1/2001 | Breslin | ............... | B60D 1/465 254/419 |
| 6,718,747 B2 * | 4/2004 | Friesen | ............ | A01D 67/005 254/420 |
| 7,249,754 B2 * | 7/2007 | Garceau | ............ | B60S 9/06 254/418 |
| 8,517,413 B2 * | 8/2013 | Chen | ............... | B25H 1/04 248/370 |
| 2010/0019471 A1 | 1/2010 | Ruckle et al. | | |
| 2010/0919471 | 1/2010 | Ruckle et al. | | |

\* cited by examiner

FOLDING STAND FOR AN AGRICULTURAL IMPLEMENT

BACKGROUND

The invention relates generally to agricultural implements. Specifically, the embodiments disclosed herein generally relate to folding stand assemblies for agricultural implements.

Many types of agricultural implements are used for a variety of tasks, such as cultivating, tilling, planting, and harvesting. For example, seeders and planters are agricultural implements that include devices that create a trench in soil, deposit seeds into the trench, and fill the trench. A seeding/planting agricultural implement may include a central section or bar coupled to a tow bar and wing assemblies coupled to either side of the tow bar. The wing assemblies typically include tool bars that extend perpendicular from the tow bar, row units that perform the farming operation and are mounted on the tool bars, and supporting wheel assemblies disposed along the length of the tool bars. Likewise, other agricultural implements such as cultivators may include transverse members that extend perpendicularly from the tow bar. During transport, the agricultural implement may be loaded, for example, onto a truck bed and secured for travel. It would be beneficial to improve structural aspects of supporting an agricultural implement for truck travel and/or storage operations.

BRIEF DESCRIPTION

In one embodiment, an agricultural implement system includes a folding stand. The folding stand includes an attachment member configured to attach the folding stand to an agricultural implement, wherein the attachment member comprises a track. The folding stand further includes a support member coupled to attachment member, wherein the support member comprises a sliding member disposed onto the track, the sliding member configured to slidably follow the track. The folding stand additionally includes an abutment member disposed on a first end of the support member and configured to abut against a portion of the agricultural implement when the folding stand is in a fully deployed position and to not abut against the portion of the agricultural implement when the folding stand in a stowaway position. The folding stand also includes a base plate disposed on a second end of the support member opposite the first end and configured to abut against a ground or a bed of a transport vehicle when the folding stand is in the fully deployed position, wherein the folding stand is configured to aid in carrying a weight of the agricultural implement when in the fully deployed position.

In another embodiment, a folding stand system includes an attachment member configured to attach the folding stand to an equipment system, wherein the attachment member comprises a track. The folding stand system additionally includes a support member coupled to attachment member, wherein the support member comprises a sliding member disposed onto the track, the sliding member configured to slidably follow the track. The folding stand system further includes an abutment member disposed on a first end of the support member and configured to abut against a portion of the equipment system when the folding stand is in a fully deployed position and to not abut against the portion of the equipment system when the folding stand in a stowaway position. The folding stand system also includes a base plate disposed on a second end of the support member opposite the first end and configured to abut against a ground or a bed of a transport vehicle when the folding stand is in the fully deployed position, wherein the folding stand is configured to aid in carrying a weight of the agricultural implement when in the fully deployed position.

In a further embodiment, an agricultural implement system includes an agricultural implement and a folding stand. The pivotable lift assembly includes a first bar member and a second bar member rotatively coupled to the first bar member. The pivotable lift assembly further includes a first wheel assembly disposed on a first end of the second bar member and a second wheel assembly disposed on a second end of the second bar member. The pivotable lift assembly also includes an attachment assembly configured to attach the pivotable lift assembly to the agricultural implement, wherein the pivotable lift assembly is configured to aid in carrying a weight of the agricultural implement.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Agricultural implements, for example, planters, may include wing wheel assemblies to support the implement during various modes of operation (e.g., while turning at a headland, while operating in a planting mode, while transporting the implement, etc.). The wing wheel assemblies may be coupled to an inner hitch assembly for supporting some of the agricultural implement's weight as well as useful in towing the agricultural implement. During transport operations, the wing wheel assemblies may be folded, and a shipping stand may be placed, for example, near a distal end of the inner hitch and used to aid in supporting the weight of the agricultural implement. The techniques described herein provide for a folding stand that may be deployed for transport and/or for storage purposes.

The folding stand may include a stowaway position, for example, under a hitch system of the agricultural implement for when the folding stand is not deployed. To deploy the folding stand, an operator may remove a locking pin holding the folding stand in the stowaway position. The folding stand may then begin to deploy using gravity (e.g., via its own weight), with a spring tension or bias dampening the lowering speed. A linkage assembly may be used guide the folding stand into a deployed vertical position. In the vertical position, the operator may lock the stand so as to aid in supporting the weight of the agricultural implement, for example, during transport, during storage, during maintenance activities, and so on. To place the folding stand in the stowaway position, the operator may remove a lock out pin and lift the stand to guide it back into the stowaway position. The spring which dampened the deployment of the folding stand may now be in tension and thus aid in lifting the folding stand into the stowaway position. The linkage assembly may once again guide the stand into its stowaway position, and the lock out pin may then be inserted to securely stow away the folding stand. Handles may be disposed on the folding stand to let the operator lower and/or raise the folding stand more quickly. It is to be understood that while the folding stand is shown and described as disposed in an agricultural implement, the folding stand may be provided in a variety of machinery or equipment.

Figure 1:
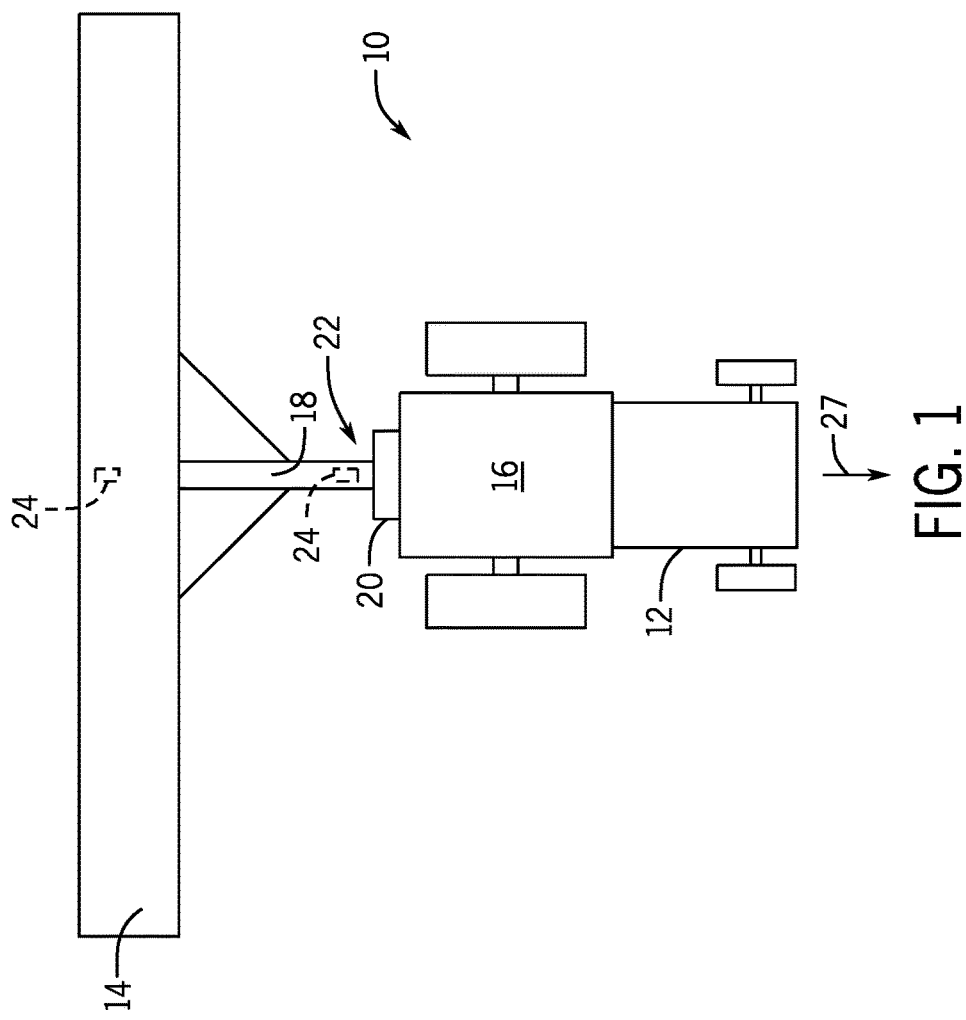
FIG. 1 is a top block view of an agricultural implement that may include a folding stand suitable for aiding in supporting some of the weight of the agricultural implement, in accordance with an embodiment of the present approach.

For illustrations purposes describing an agricultural implement that may include a folding stand, FIG. 1 is a top block view of an embodiment of an agricultural system 10. The agricultural system 10 includes an agricultural vehicle 12 and an agricultural implement 14. In some embodiments, the agricultural implement 14 may be towed behind the agricultural vehicle 12 (e.g., as shown in FIG. 1). The agricultural vehicle 12 may be any vehicle suitable for towing the agricultural implement 14, such as a tractor, off-road vehicle, work vehicle, or the like. The agricultural vehicle 12 may include a cab 16, in which an operator sits during operation of the agricultural vehicle 12. The cab 16 may be an open or closed cab. Additionally, the agricultural implement 14 may be any suitable implement, such as a ground-engaging implement (e.g., a soil conditioner, a tillage implement, a fertilizer application implement, a planter, a seeder, etc.) or a sprayer/applicator, suitable for agricultural use. The agricultural implement 14 may be coupled to the agricultural vehicle 12 via a hitch system 18. The hitch system 18 may rigidly couples the agricultural implement 14 to the vehicle 12, such that the implement 14 can move upward and downward, but cannot freely rotate with respect to the vehicle 12. It should be understood, however that other systems for coupling the implement 14 to the vehicle 12 may be possible.

A two-point (or three-point) hitch assembly 20 may be positioned at a distal end 22 of the hitch system 18 to couple the hitch system 18 to a variety of tools, other agricultural implements, and the like. Also shown near the hitch assembly 22 is a folding stand 24 (shown in dashed lines) positioned under the hitch system 18. As the agricultural implement is removed from the vehicle 12, some of the weight of the agricultural implement may be supported via the folding stand 24 when the folding stand 24 is deployed into a support position, as further described below.

For example, the folding stand 24 is suitable for deploying into a support position for engaging the ground, a truck bed, and so on, to aid in weight distribution of the agricultural implement 14, and may include certain pivotable embodiments to enable a more secure and efficient transport of the agricultural implement 14. The folding stand 24 may include a variety of features to aid in lowering the folding stand 24 to the support position, as well as for raising and securing the folding stand 24 into a stowaway position when the agricultural implement is used, for example, for farming operations.

Figure 2:
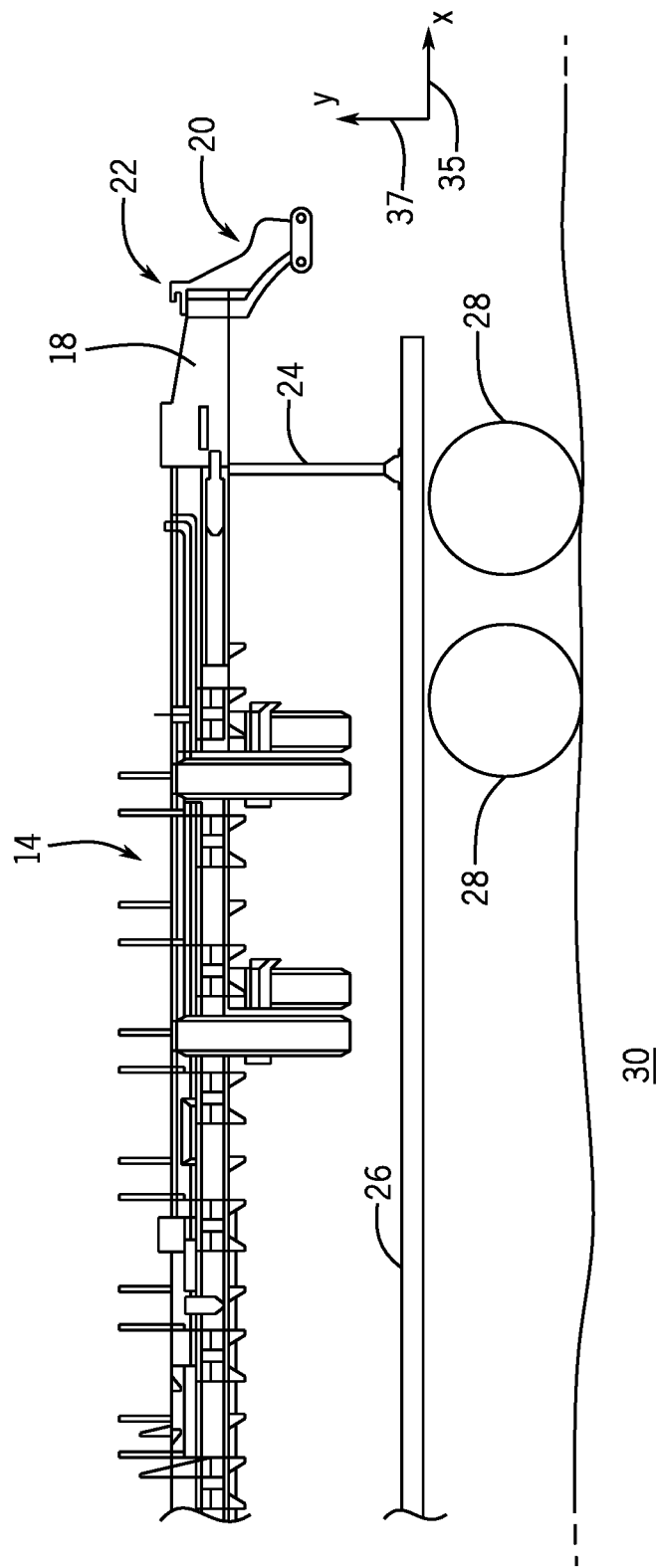
FIG. 2 is a side view illustrating an embodiment of the agricultural implement having the folding stand disposed onto a vehicle (e.g., truck) bed for transport, in accordance with an embodiment of the present approach.

It may be beneficial to show an application of the folding stand 24 to be disposed for transport. Turning now to FIG. 2, is a side view illustrating an embodiment of the agricultural implement 14 disposed onto a vehicle (e.g., truck) bed 26 for transport. Because the figure includes like elements from the figure above, the like elements include like element numbers. In the depicted embodiment, the agricultural implement 14 is shown in a folded position for transport via a vehicle with the 2-point hitch 20 disposed aft over the vehicle bed 26. More specifically, the hitch system 18 is approximately parallel to the vehicle bed 26 with respect to an X-axis 35. Rear wheels 28 are shown with respect to ground 30. The folding stand 24 may be disposed (e.g., unfolded to be perpendicular to the X-axis 35 and parallel to Y-axis 37) towards the distal end 22 of the hitch system 18 and deployed to aid in supporting the weight of the agricultural implement 14. For example, an operator may load the agricultural implement 14 onto the truck bed 26 and deploy the folding stand 14 into the support position. The agricultural implement 14 may then be secured onto the vehicle bed 26 and transported to a desired destination. It is to be noted that multiple folding stands 14 may be deployed, for example, based on a length and/or weight of the agricultural implement 14. Likewise, the folding stand 24 may be disposed onto other agricultural or non-agricultural implements that may benefit from weight support, such as construction equipment, mining equipment, and so on.

Figure 3:
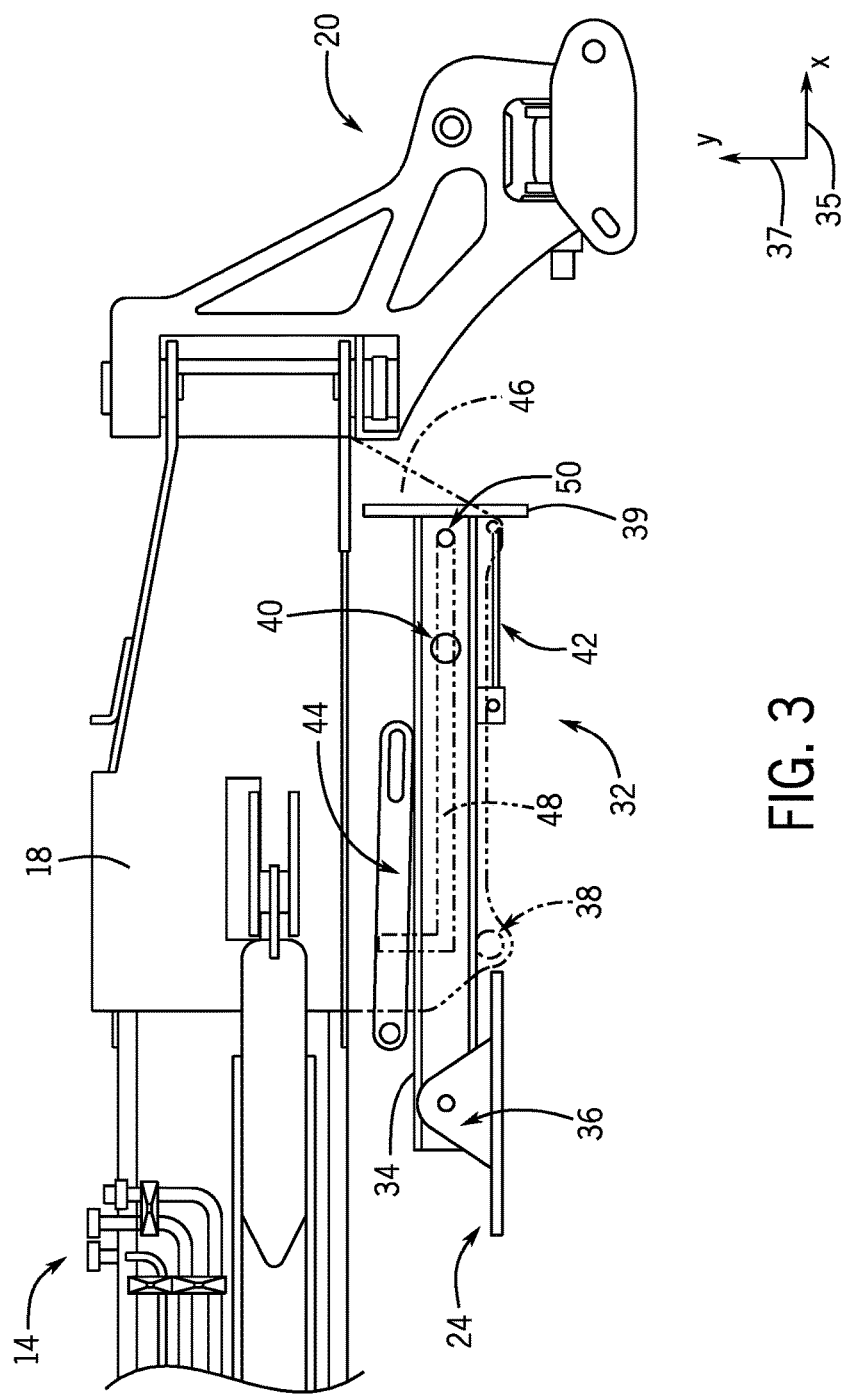
FIG. 3 is a detail side view of an embodiment of the folding stand of FIGS. 1 and 2 disposed onto the hitch system of the agricultural implement in a stowaway position, in accordance with an embodiment of the present approach.

FIG. 3 is a detail side view of an embodiment of the folding stand 24 disposed onto the hitch system 18 of the agricultural implement 14. Because the figure utilizes like elements as those found in the figures above, the like elements are illustrated using like element numbers. As shown, the figure illustrates the folding stand 14 shown in a stowaway position 32. In the stowaway position 32, a support bar member 34 of the folding stand 24 is disposed parallel to the hitch system 18 with respect to the X-axis 35 (which is perpendicular to Y-axis 37). Accordingly, space occupied by the folding stand 24 is minimized during field operations of the agricultural vehicle 14. Also shown is an abutment member (e.g., top plate member) 39 disposed on top of the support bar member 34 and used to abut or "press" against the hitch system 38 when the folding stand 24 is fully deployed and secured. Although the abutment member 39 is shown as a top plate, this could be any material or technique that abuts against a portion of the agricultural implement when fully deployed such as plate, tube, or pin.

In the stowaway position 32, a pivoting baseplate 36 may pivot to also be parallel to the support bar member 34, to minimize space. A lockout pin 38 may be inserted to secure the folding stand 14 in place. A lockout hole 40 (e.g. through hole) is also provided, which may be used to insert the locking pin 38 (or other pin) to securely hold the folding stand 24 when fully deployed, as described in more detail below. Also shown are an assist spring 42 and an assist linkage 44. The assist spring 42 may provide a bias that aids in lifting the folding stand 24 into the stowaway position 32. The assist linkage 44 may aid in maintaining movement of the support bar member 34 in an X-Y plane as the folding stand 24 is deployed and as the folding stand 24 is stored in the stowaway position 32, thus providing for a smoother deployment and storage of the folding stand 24.

The folding stand 24 may be secured to the hitch system 18 via attachment member 46. For example, the attachment member 46 may be manufactured out of flat metal stock or plate with an L-shaped track or groove 48 cut or otherwise manufactured into the metal stock. The L-shaped track or groove 48 includes a first track portion 49 parallel to the X-axis 35 and a second track portion 51 parallel to the Y-axis 37. The attachment member 46 may be secured onto the hitch system 18 via welds and/or via other fastening techniques (e.g., nuts and bolts). A sliding member (e.g., pin that slides) may thus be disposed inside the L-shaped track 48 and slide in the track 48 during deployment and/or storage of the folding stand 24. By following the L-shaped track 48, the pin 50 may provide for a smoother deployment and storage of the folding stand 24.

Figure 4:
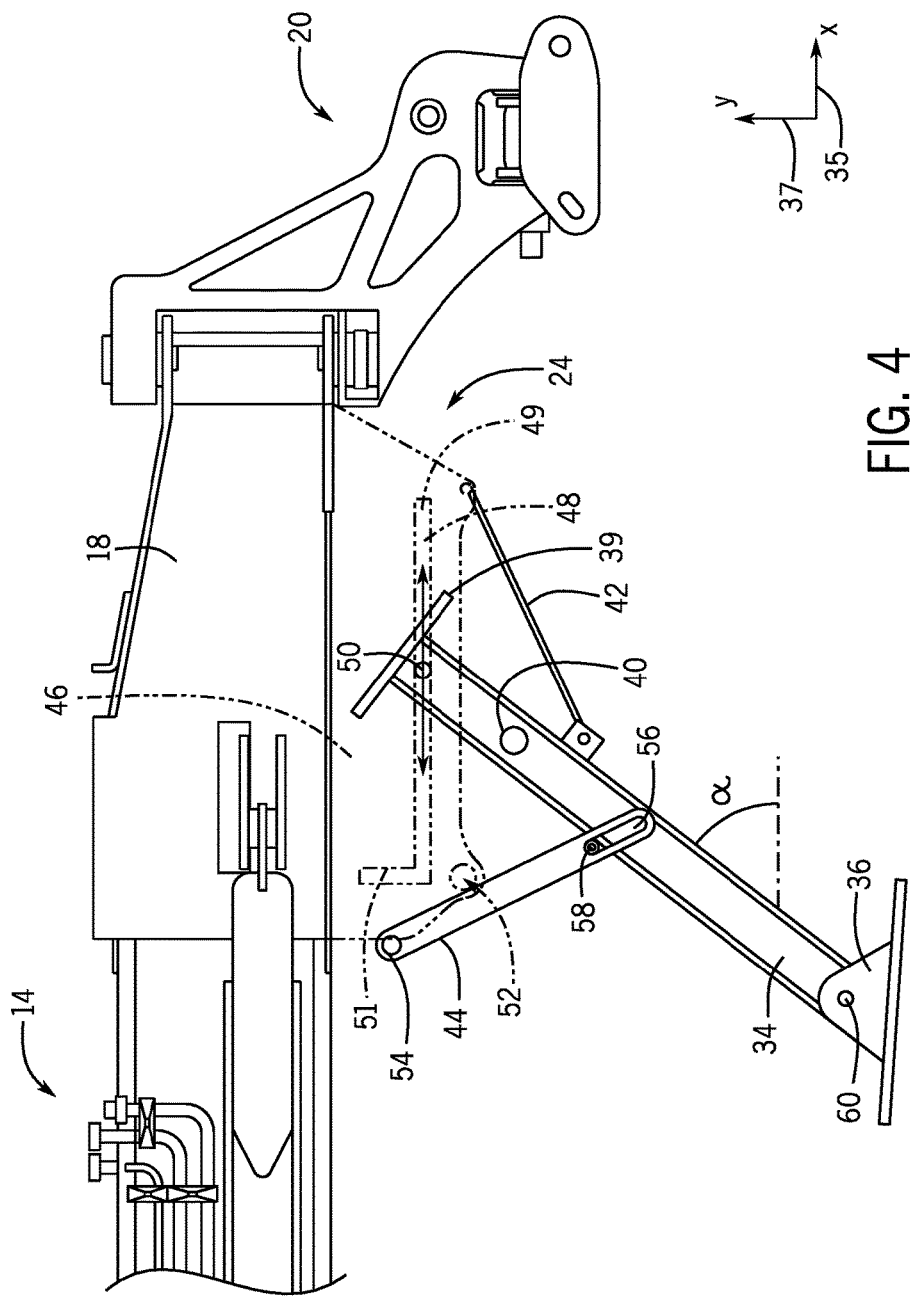
FIG. 4 is detail side view of the folding stand of FIG. 3 deploying to provide added weight support for the agricultural equipment, in accordance with an embodiment of the present approach.
Figure 5:
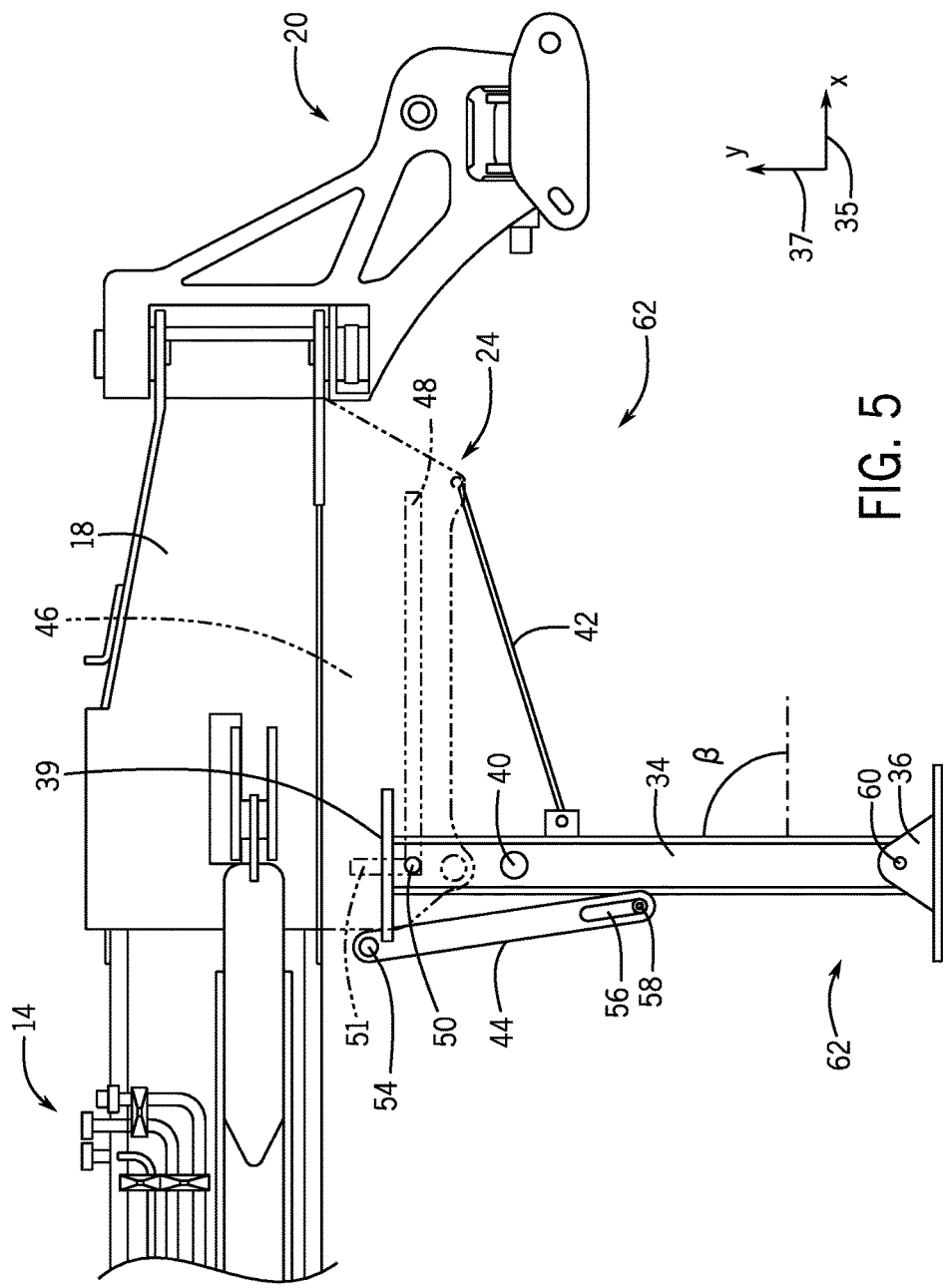
FIG. 5 is a is detail side view of the folding stand of FIG. 3 disposed in a bottom position, in accordance with an embodiment of the present approach.
Figure 6:
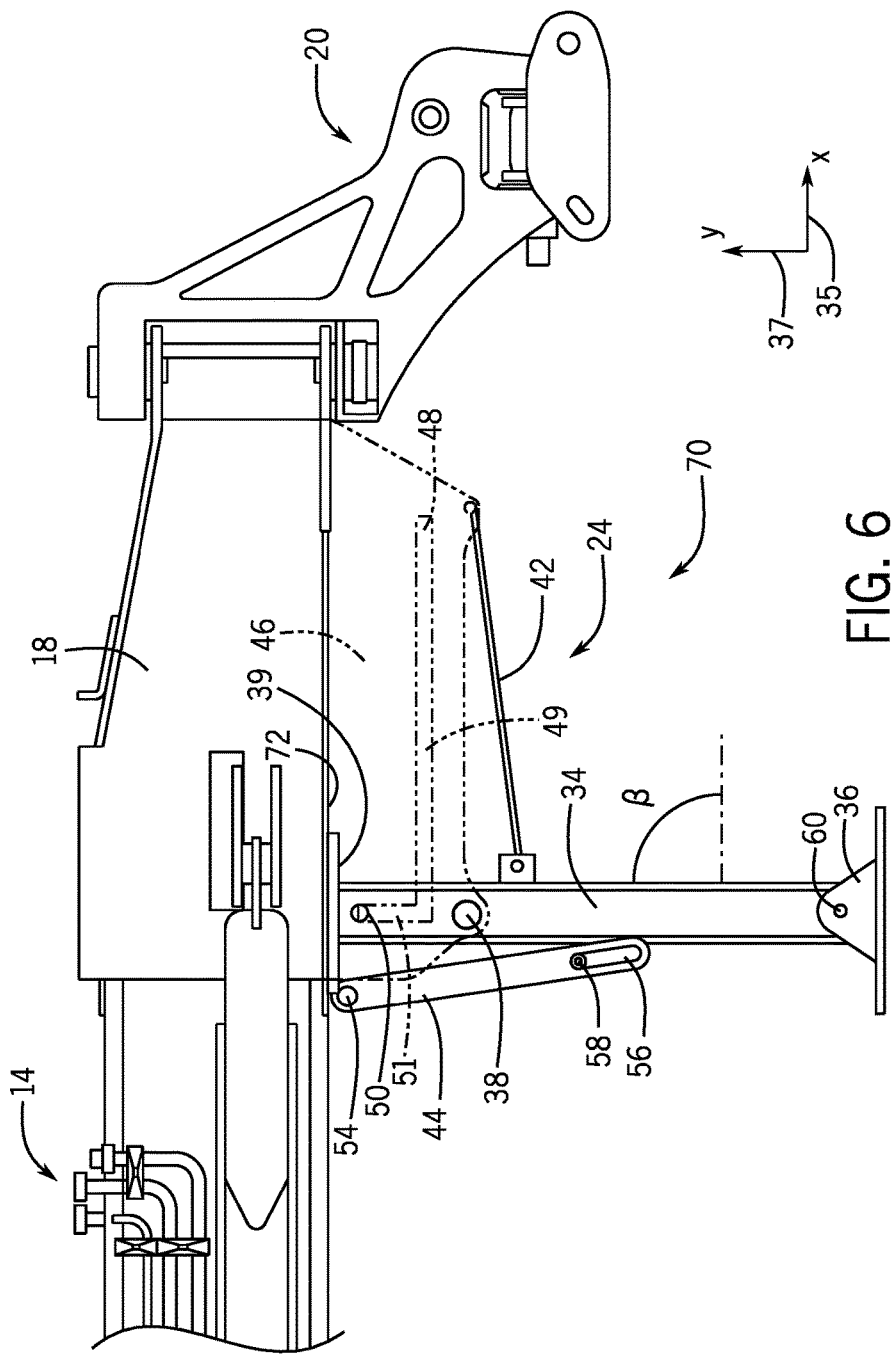
FIG. 6 is detail side view of the folding stand of FIG. 3 in a fully deployed position, in accordance with an embodiment of the present approach.

FIGS. 4-6 illustrate embodiments of the folding stand 24 as the folding stand 24 is deployed and locked. For example, FIG. 4 depicts an embodiment of the folding stand 24 deploying to provide added weight support for the agricultural equipment 14. Because the figure includes like elements from the figures above, the like elements include like element numbers. The operator may first remove the lockout pin 38 disposed in a through hole, and gravity may then lower the folding stand 24. As the folding stand 24 deploys, the pin 50 travels following the track 48 (e.g., portion 49). The spring 42 provides a dampening bias, enabling a smoother and more controlled lowering of the folding stand 24.

The assist linkage 44 may rotate about pivot point 54 and include a groove or track 56 at an end opposite the pivot point 54. The assist linkage 44 may be mechanically coupled to the attachment member 46 via the pivot point 54 and to the support member 34 via sliding fasteners 58 (e.g., pins, nuts and bolts). The assist linkage 44 may aid in lowering the folding stand 24 and in maintaining movement of the support member 34 in the X-Y plane. The baseplate 36 may include a pivot point 60 enabling the plate to pivot and maintain a ground orientation as the folding stand 24 is lowered. In the depicted embodiment, the support member is at an angle $\alpha$ with respect to ground 30.

Turning now to FIG. 5, the figure illustrates an embodiment of the folding stand 24 disposed in a bottom position 62. Because the FIG. 5 includes like elements from the figures above, the like elements include like element numbers. As shown, the pin 50 (e.g., sliding member) has slid to a rearmost position of the portion 49 and is now abutting against a side of the attachment member 46. Likewise, the fastener 58 has slid to a rearward position in the groove 56 of the assist linkage 44. Accordingly, the bottom position 62 is the lowest position of the baseplate 36 with respect to the agricultural implement 14. The base plate 36 is also shown substantially parallel to the X-axis as the base plate 36 may freely pivot through pivot point 60 during the process of deploying the folding stand 24.

In the depicted embodiment, the support member 34 is disposed at an angle $\beta$ with respect to ground 30, such as 90 degrees or perpendicular to ground 30. The spring 42 is shown as having an increased stretch when compared to FIGS. 3 and 4, providing a spring bias should the operator decide to lift the folding stand 24 back into the stowaway position 32. To lock the folding stand 24 into its deployed position, for example, for equipment storage or truck transport, the operator would lift the support member 34 straight up (e.g., moving the support member 34 in the Y-axis away from ground 30) and then lock the folding stand 24, as shown in FIG. 6.

More specifically FIG. 6, illustrates and embodiment of the folding stand 24 in a fully deployed and locked position 70. In the locked position 70 the abutment member (e.g., top plate member) 39 abuts a lower portion 72 of the hitch system 18, thus aiding in providing weight support for the hitch member 18 and the agricultural implement 14. Indeed, some of the weight of the agricultural implement 14 may be supported by the abutment member 39 coupled to the support bar member 34 which in turn is coupled to the baseplate 36. Because the figure includes like elements from the figures above, the like elements include like element numbers. In certain uses, such as for weight support during truck transport, it may be beneficial to "lock" the rotational component(s) of the folding stand 24. For example, the support member 34 may be securely fastened onto the attachment member 46 to minimize or eliminate any movement, such as rotational movement.

Accordingly, FIG. 6 illustrates the support bar member 34 moved upwards so that the sliding pin 50 abuts against a top end of the groove 51, and the lockout pin 38 may now be disposed into openings 40 and 52 (e.g., through holes) to securely lock the folding stand 24 into the fully deployed and locked position 70. The folding stand 24 may now securely aid in supporting some of the weight of the agricultural implement 14. To fold the folding stand 24 back into the stowaway position 32, the operator may reverse the process and remove pin 38 from openings 40 and 52. The spring 42 may then aid in retracting the support bar member 34 as the support bar member 34 is rotated back to the stowaway position 32 and locked.

It is to be noted that the folding stand 24 may be provided, in some embodiments, as a kit. That is, all components of the folding stand 24, e.g., attachment member 46, support bar member 34 (with abutment member 39 attached), assist linkage 44, pivotable baseplate 36, assist spring 42, and so on, may be provided in the kit along with assembly instructions. For example, the assembly instructions may illustrate or otherwise instruct that the attachment member 46 be welded or otherwise fastened onto a desired support area (e.g., directly behind before the 2-point hitch and under the hitch system 18, such as on lower portion 72). Indeed, the folding stand 24 may be used to easily retrofit any number of equipment or machinery. It is to be understood that according to equipment size and weight, more than one folding stand 24 may be used to provide weight support.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement system, comprising:
a folding stand comprising:
an attachment member configured to attach the folding stand to an agricultural implement, wherein the attachment member comprises a track;
a support member coupled to the attachment member, wherein the support member comprises a sliding member disposed onto the track, the sliding member configured to slidably follow the track;
an abutment member disposed on a first end of the support member and configured to abut against a portion of the agricultural implement when the folding stand is in a fully deployed position and to not abut against the portion of the agricultural implement when the folding stand in a stowaway position; and
a base plate disposed on a second end of the support member opposite the first end and configured to abut against a ground or a bed of a transport vehicle when the folding stand is in the fully deployed position, wherein the folding stand is configured to aid in carrying a weight of the agricultural implement when in the fully deployed position wherein the folding stand comprises an assist spring coupling the support member to the attachment member, and wherein the assist spring provides a spring bias counter to gravity when the support member is deployed from the stowaway position to the fully deployed position, when the support member is deployed from the fully deployed position to the stowaway position, or a combination thereof.

2. The agricultural implement system of claim 1, wherein the folding stand comprises an assist linkage coupling the support member to the attachment member.

3. The agricultural implement system of claim 2, wherein the assist linkage comprises a pivot point coupling the support member to the attachment member, the pivot point configured to enable a rotation of the support member with respect to the attachment member.

4. The agricultural implement system of claim 2, wherein the assist linkage comprises a second track disposed opposite the pivot point, and wherein a second sliding member slidably couples the assist linkage to the support member and is configured to slidably follow the second track.

5. The agricultural implement system of claim 1, wherein the folding stand comprises a locking pin, wherein the support member comprises a first through hole and the attachment member comprises a second through hole, and wherein the locking pin is inserted through the first through hole and the second through hole in the stowaway position to securely lock the support member to the attachment member.

6. The agricultural implement system of claim 1, wherein the track comprises a horizontal portion and a vertical portion, wherein the horizontal portion is disposed perpendicular to the vertical portion.

7. The agricultural implement system of claim 6, wherein the sliding member slidably follows the horizontal portion and then the vertical portion as the support member transitions from the stowaway position into the fully deployed position.

8. The agricultural implement system of claim 1, comprising the agricultural implement attached to the folding stand via the attachment member, wherein the agricultural implement comprises a planter, a soil conditioner, a tillage implement, a fertilizer application implement, a seeder, or a combination thereof.

9. A folding stand system, comprising:
an attachment member configured to attach the folding stand to an equipment system, wherein the attachment member comprises a track;
a support member coupled to the attachment member, wherein the support member comprises a sliding member disposed onto the track, the sliding member configured to slidably follow the track;
an abutment member disposed on a first end of the support member configured to abut against a portion of the equipment system when the folding stand is in a fully deployed position and to not abut against the portion of the equipment system when the folding stand in a stowaway position; and
a base plate disposed on a second end of the support member opposite the first end and configured to abut against a ground or a bed of a transport vehicle when the folding stand is in the fully deployed position, wherein the folding stand is configured to aid in carrying a weight of the agricultural implement when in the fully deployed position wherein the track comprises a horizontal portion and a vertical portion, wherein the horizontal portion is disposed perpendicular to the vertical portion, and wherein the sliding member slidably follows the horizontal portion and then the vertical portion as the support member transitions from the stowaway position into the fully deployed position.

10. The folding stand system of claim 9, comprising an assist linkage coupling the support member to the attachment member, wherein the assist linkage comprises a pivot point coupling the support member to the attachment member, the pivot point configured to enable a rotation of the support member with respect to the attachment member.

11. The folding stand system of claim 10, wherein the assist linkage comprises a second track disposed opposite the pivot point, and wherein a second sliding member slidably couples the assist linkage to the support member and is configured to slidably follow the second track.

12. An agricultural implement system, comprising:
an agricultural implement; and
a folding stand comprising:
an attachment member configured to attach the folding stand to an agricultural implement, wherein the attachment member comprises a track;
a support member coupled to the attachment member, wherein the support member comprises a sliding member disposed onto the track, the sliding member configured to slidably follow the track;
an abutment member disposed on a first end of the support member and configured to abut against a portion of the agricultural implement when the folding stand is in a fully deployed position and to not abut against the portion of the agricultural implement when the folding stand in a stowaway position; and
a base plate disposed on a second end of the support member opposite the first end and configured to abut against a ground or a bed of a transport vehicle when the folding stand is in the fully deployed position, wherein the folding stand is configured to aid in carrying a weight of the agricultural implement when in the fully deployed position wherein the folding stand comprises an assist linkage coupling the support member to the attachment member, wherein the assist linkage comprises a pivot point coupling the support member to the attachment member, the pivot point configured to enable a rotation of the support member with respect to the attachment member, wherein the assist linkage comprises a second track disposed opposite the pivot point, and wherein a second sliding member slidably couples the assist linkage to the support member and is configured to slidably follow the second track.

13. The agricultural implement system of claim 12, wherein the folding stand comprises an assist spring coupling the support member to the attachment member, and wherein the assist spring provides a spring bias counter to gravity when the support member is deployed from the stowaway position to the fully deployed position, when the support member is deployed from the fully deployed position to the stowaway position, or a combination thereof.

* * * * *